United States Patent [19]

Barker et al.

[11] Patent Number: 5,738,691
[45] Date of Patent: Apr. 14, 1998

[54] ULTRASONIC EXTRACTION OF PLASTICIZER FROM ELECTROCHEMICAL CELLS

[75] Inventors: Jeremy Barker; Wade Guindy, both of Henderson, Nev.

[73] Assignee: Valence Technology, Inc., Henderson, Nev.

[21] Appl. No.: 840,336

[22] Filed: Apr. 28, 1997

[51] Int. Cl.$^6$ .................................. H01M 10/38
[52] U.S. Cl. .................. 29/623.1; 29/623.4; 29/623.5; 429/4
[58] Field of Search ................... 29/623.1, 623.5, 29/623.4; 429/4, 192

[56] References Cited

U.S. PATENT DOCUMENTS

| | | |
|---|---|---|
| 4,304,656 | 12/1981 | Lee . |
| 5,358,725 | 10/1994 | Izumitani et al. . |
| 5,418,091 | 5/1995 | Gozdz et al. . |
| 5,456,000 | 10/1995 | Gozdz et al. . |
| 5,460,904 | 10/1995 | Gozdz et al. . |
| 5,463,177 | 10/1995 | Youngs . |
| 5,540,741 | 7/1996 | Gozdz et al. . |
| 5,552,239 | 9/1996 | Gozdz et al. ............ 429/192 X |
| 5,607,485 | 3/1997 | Gozdz et al. ............ 29/623.5 |

*Primary Examiner*—Anthony Skapars
*Attorney, Agent, or Firm*—Robert Krebs

[57] ABSTRACT

A method for removing plasticizers such dibutyl phthalate from the anode, cathode, and polymeric matrix components of an electrochemical cell precursor using an extraction solvent and ultrasound waves is provided.

27 Claims, No Drawings

ULTRASONIC EXTRACTION OF PLASTICIZER FROM ELECTROCHEMICAL CELLS

BACKGROUND OF THE INVENTION

1. Field of the Invention

This invention relates to fabricating solid electrochemical (electrolytic) cells and, more particularly, to a method for removing plasticizer from an electrochemical cell (or a precursor thereof) using an extraction solvent and ultrasound waves.

2. State of the Art

Non-aqueous lithium electrochemical cells typically include an anode, a lithium electrolyte prepared from a lithium salt dissolved in one or more organic solvents and a cathode of an electrochemically active material, typically a chalcogenide of a transition metal. During discharge, lithium ions from the anode pass through the liquid electrolyte to the electrochemically active material of the cathode where the ions are taken up with the simultaneous release of electrical energy. During charging, the flow of ions is reversed so that lithium ions pass from the electrochemically active cathode material through the electrolyte and are plated back onto the lithium anode.

More recently, the lithium metal anode has been replaced with a carbon anode such as coke or graphite intercalated with lithium ions to form $Li_xC$. In operation of the cell, lithium passes from the carbon through the electrolyte to the cathode where it is taken up just as in a cell with a metallic lithium anode. During recharge, the lithium is transferred back to the anode where it reintercalates into the carbon. Because no metallic lithium is present in the cell, melting of the anode does not occur even under abuse conditions. Also, because lithium is reincorporated into the anode by intercalation rather than by plating, dendritic and spongy lithium growth does not occur. Non-aqueous lithium electrochemical cells are discussed in U.S. Pat. Nos. 4,472,487, 4,668, 595 and 5,028,500.

Various factors influence the performance of electrochemical cells. For instance, the morphology of the polymeric matrix and of the polymeric binders in the anode and/or cathode can affect conductivity of the salts. Enhancement of conductivity has been demonstrated by forming porous polymeric matrices and polymeric binders. One method of producing such porous structures comprises forming polymeric structures in the presence of a plasticizer and then removing the plasticizer to create pores in the polymer. The plasticizer is typically removed from such polymeric materials by extraction using a suitable solvent as described, for example, in U.S. Pat. No. 5,540,741. These conventional extraction methods, however, are inefficient and time-consuming, often requiring that the polymeric material be contacted with the extraction solvent for relatively long periods of time. Accordingly, there is a need for more efficient methods of removing plasticizer from electrochemical cells.

SUMMARY OF THE INVENTION

The present invention provides an efficient method for removing plasticizer from an electrochemical cell precursor using an extraction solvent and ultrasound waves. By applying ultrasound waves during the extraction process, the time required to remove the plasticizer from the electrochemical cell precursor is significantly reduced compared to conventional extraction methods.

Accordingly, in one of its method aspects, this invention is directed to a method for removing plasticizer from an electrochemical cell precursor, said method comprising the steps of:

(a) contacting an electrochemical cell precursor comprising (i) an anode composition comprising an anodic material, a first polymer, and a first plasticizer; (ii) a cathode composition comprising a cathode active material, a second polymer, and a second plasticizer; and (iii) a polymeric matrix comprising a third polymer and a third plasticizer, with an extraction solvent; and (b) applying ultrasound waves to the electrochemical cell precursor and the extraction solvent to extract at least a portion of the first, second and/or third plasticizer from the electrochemical cell precursor.

In a preferred embodiment, the extraction method further comprises:

(c) removing the extraction solvent from contact with the electrochemical cell precursor.

In another preferred embodiment, the extraction method is carried out at a temperature ranging from ambient temperature to the boiling point of the extraction solvent.

In another of its method aspects, this invention is directed to a method of preparing an electrochemical cell, which method comprises the steps of:

(a) forming an anode composition comprising an anodic material, a first polymer, and a first plasticizer;

(b) forming a cathode composition comprising a cathode active material, a second polymer, and a second plasticizer;

(c) forming a polymeric matrix comprising a third polymer and a third plasticizer;

(d) bonding said polymeric matrix to said anode composition and said cathode composition to form an electrochemical cell precursor;

(e) extracting at least a portion of said first, second and/or third plasticizer from said electrochemical cell precursor by contacting said electrochemical cell precursor with an extraction solvent while simultaneously applying ultrasound waves to said electrochemical cell precursor and said extraction solvent; and (f) contacting said electrochemical cell precursor with an electrolyte solution comprising an electrolyte solvent and a salt to form an electrochemical cell.

Preferably, the anodic material employed in this invention comprises a carbon material selected from the group consisting of carbon black, coke, graphite, disordered carbon, hard carbon and mixtures thereof.

The cathode active material employed is preferably selected from the group consisting of $Li_xMn_2O_4$, wherein $0<x\leq2$, $LiCoO_2$, $LiNiO_2$, $LiNi_yCo_{1-y}O_2$, wherein $0<y<1$, and mixtures thereof.

Preferably, the polymer(s) used in this invention is selected from the group consisting of copolymers of vinylidene difluoride and hexafluoropropylene, polyvinylidene difluoride, copolymers of ethylene and acrylic acid, copolymers of ethylene and vinyl acetate, and mixtures thereof. More preferably, the polymer is a copolymer of vinylidene difluoride and hexafluoropropylene.

Preferably, the plasticizer(s) employed in this invention is selected from the group consisting of dialkyl phthalates, wherein each alkyl group independently contains 1 to about 12 carbon atoms; trisbutoxyethyl phosphate; propylene carbonate; ethylene carbonate; trimethyl trimellitate; and mixtures thereof. More preferably, the plasticizer is a dialkyl phthalate selected from the group consisting of dimethyl phthalate, diethyl phthalate, dibutyl phthalate, dioctyl phthalate and mixtures thereof. Still more preferably, the plasticizer is dibutyl phthalate.

The extraction solvent employed in this invention is preferably selected from the group consisting of alkanes and cycloalkanes having 5 to about 12 carbon atoms; aliphatic alcohols having 1 to about 12 carbon atoms; haloalkanes and haloalkenes having 1 to about 6 carbon atoms; dialkyl ethers and cycloalkyl ethers having 4 to about 12 carbon atoms; dialkyl formates, wherein each alkyl group independently contains 1 to about 6 carbon atoms; dialkyl carbonates, wherein each alkyl group independently contains 1 to about 6 carbon atoms; and mixtures thereof. More preferably, the extraction solvent is an aliphatic alcohol selected from the group consisting of methanol, ethanol, n-propanol, isopropanol, n-butanol, isobutanol and mixtures thereof. Still more preferably, the extraction solvent is methanol.

In the methods of this invention, the electrolyte solvent preferably comprises one or more organic carbonates. More preferably, the electrolyte solvent comprises a mixture of ethylene carbonate and dimethyl carbonate.

Additionally, the salt used in this invention is preferably an alkali metal salt of an anion selected from the group consisting of $I^-$, $Br^-$, $SCN^-$, $ClO_4^-$, $BF_4^-$, $PF_6^-$, $AsF_6^-$, $CF_3COO^-$, $CF_3SO_3^-$, and $N(SO_2CF_3)_2^-$.

DETAILED DESCRIPTION OF THE INVENTION

The present invention is based in part on the discovery that the use of ultrasound waves significantly improves the efficiency of the extraction of plasticizers, such as dibutyl phthalate, from the anode, cathode, and/or polymeric matrix of the precursor of an electrochemical cell. Upon removal of the plasticizer, the polymer network of these components has a stable porous structure. Thereafter, the precursor is activated by the addition of an electrolyte solution comprising electrolyte solvents and salts. Electrochemical cells so fabricated demonstrate superior electrochemical performance. The plasticizer may also be recovered in a recycle process.

Preferred electrochemical cells comprise a cathode comprising a cathode active material and an intercalation-based carbon anode, with each electrode capable of reversibly incorporating (e.g., intercalating) an alkali metal ion, and a polymeric matrix containing an electrolyte solution comprising an organic electrolyte solvent and a salt of the alkali metal. Each electrode has a current collector. Particularly preferred electrochemical cells and batteries use lithium and salts thereof.

Preferably, the anode comprises an anode film that is laminated onto one or both sides of a current collector which is a thin metal foil or grid. Typically, each anode film is from about 100 μm to about 250 μm in thickness, preferably about 110 μm to about 200 μm, and more preferably about 125 μm to about 175 μm.

Similarly, the cathode preferably comprises a cathode fill that is laminated onto one or both sides of the current collector which is a thin foil or grid. Typically, each cathode film is from about 100 μm to about 200 μm in thickness, preferably about 130 μm to about 175 μm, and more preferably about 140 μm to about 165 μm.

The anode and cathode each also preferably include a current collector that comprises, for example, a screen, grid, expanded metal, woven or non-woven fabric formed from an electron conductive material such as metals or alloys.

Preferably, the current collector has a thickness from about 25 μm to about 75 μm, preferably about 35 μm to about 65 μm, and more preferably about 45 μm to about 55 μm. Each current collector is also connected to a current collector tab which extends from the edge of the current collector. In batteries comprising multiple electrochemical cells, the anode tabs are preferably welded together and connected to a copper or nickel lead. The cathode tabs are similarly welded and connected to a lead. External loads can be electrically connected to the leads. Current collectors and tabs are described in U.S. Pat. Nos. 4,925,752, 5,011,501, and 5,326,653, which are incorporated herein.

Prior to describing this invention in further detail, the following terms will be defined.

The terms "ultrasound waves" or "ultrasonic waves" or "ultrasonic energy" refer to sound waves having a frequency above about 20,000 hertz.

The term "plasticizer" refers to an organic solvent, with limited solubility of polymers, that facilitates the formation of porous polymeric structures. By "porous structure" is meant that upon extraction of the plasticizer the polymer remains as a porous mass. Suitable plasticizers have high boiling points typically from about 100° C. to about 350° C. A number of criteria are important in the choice of plasticizer including compatibility with the components of the electrochemical cell precursor, processability, low polymer solubility and extractability.

Preferred plasticizers are selected from the group consisting of dialkyl phthalates, wherein each alkyl group independently contains 1 to about 12 carbon atoms; trisbutoxyethyl phosphate; propylene carbonate; ethylene carbonate; and mixtures thereof. Particularly preferred plasticizers include, by way of example, dialkyl phthalates selected from the group consisting of dimethyl phthalate, diethyl phthalate, dibutyl phthalate, dioctyl phthalate and mixtures thereof. Other preferred plasticizers include, for example, acetates, glymes and low molecular weight polymers.

Preferably the weight ratio of plasticizer to polymer is from about 1 to about 50, more preferably about 10 to about 30, and most preferably about 20 to about 25.

The term "extraction solvent" refers a low boiling organic solvent in which the plasticizer is soluble or miscible and the polymer is essentially insoluble (i.e., a non-solvent for the polymer). Preferably, the extraction solvent has a boiling less than about 150° C., more preferably less than 100° C., and still more preferably less than 75° C. Additionally, the extraction solvent preferably has a low viscosity, preferably, less than about 2.0 cp at 25° C., more preferably less than about 1.0 cp at 25° C. Preferred solvents also have low toxicity and a low fire hazard risk.

Preferably, the extraction solvent is selected from the group consisting of alkanes and cycloalkanes having 5 to about 12 carbon atoms; aliphatic alcohols having 1 to about 12 carbon atoms; haloalkanes and haloalkenes having 1 to about 6 carbon atoms; dialkyl ethers and cycloalkyl ethers having 4 to about 12 carbon atoms; dialkyl formates, wherein each alkyl group independently contains 1 to about 6 carbon atoms; dialkyl carbonates, wherein each alkyl group independently contains 1 to about 6 carbon atoms; and mixtures thereof.

Particularly preferred extraction solvent are aliphatic alcohols having 1 to about 6 carbon atoms. More preferably, the extraction solvent is an aliphatic alcohol selected from the group consisting of methanol, ethanol, n-propanol, isopropanol, n-butanol, isobutanol and mixtures thereof. An especially preferred extraction solvent is methanol.

Other preferred extraction solvents include diethyl ether, petroleum ether, propanes, butanes, pentanes, hexanes, cyclohexane, dichloromethane, trichloroethylene, fluorotrichloromethane, chlorotrifluoromethane, carbon tetrafluoride, dichlorofluromethane, chlorodifluoromethane, trifluoromethane, 1,2-dichlorotetrafluoroethane, hexafluoroethane, trichloroethane, and the like, and mixtures thereof.

The term "electrochemical cell precursor" or "electrolytic cell precursor" refers to the structure of the electrochemical cell prior to the addition of the electrolyte solution. The precursor typically comprises (each in precursor form) an anode, a cathode, and polymeric matrix. The anode and/or cathode may each include a current collector. The polymeric matrix can function as a separator between the anode and cathode.

The term "activation" refers to the placement of an inorganic salt and electrolyte solvent into an electrochemical cell precursor. After activation, the electrochemical cell is charged by an external energy source prior to use.

The term "electrochemical cell" or "electrolytic cell" refers to a composite structure containing an anode, a cathode, and an ion-conducting electrolyte interposed therebetween.

The term "battery" refers to two or more electrochemical cells electrically interconnected in an appropriate series/parallel arrangement to provide the required operating voltage and current levels.

The term "solid polymeric matrix" refers to an electrolyte compatible material formed by polymerizing an inorganic or organic monomer (or partial polymer thereof) and which, when used in combination with the other components of the electrolyte, renders the electrolyte solid. Suitable solid polymeric matrices are well known in the art and include solid matrices formed from organic polymers, inorganic polymers or a mixture of organic polymers with inorganic non-polymeric materials. Preferably, the solid polymeric matrix is an organic matrix derived from a solid matrix forming monomer and from partial polymers of a solid matrix forming monomer. See, for example, U.S. Pat. Nos. 5,501,921, 5,498,491, 5,491,039, 5,489,491, 5,482,795, 5,463,179, 5,419,984, 5,393,621, 5,358,620, 5,262,253, 5,346,787, 5,340,669, 5,300,375, 5,294,501, 5,262,253, and 4,908,283, which are incorporated herein. Inorganic monomers are disclosed in U.S. Pat. Nos. 4,247,499, 4,388,385, 4,414,607, 4,394,280, 4,432,891, 4,539,276, and 4,557,985, which are incorporated herein.

The solid matrix forming monomer or partial polymer can be cured or further cured prior to or after addition of the salt, solvent and, optionally, a viscosifier. For example, a composition comprising requisite amounts of the monomer or partial polymer, salt, organic carbonate solvent and viscosifier can be applied to a substrate and then cured. Alternatively, the monomer or partial polymer can be first cured and then dissolved in a suitable volatile solvent. Requisite amounts of the salt, organic carbonate solvent and viscosifier can then be added. The mixture is then placed on a substrate and removal of the volatile solvent would result in the formation of a solid electrolyte. In either case, the resulting solid electrolyte would be a homogeneous, single phase product which is maintained upon curing, and does not readily separate upon cooling to temperatures below room temperature.

Preferably, the solid polymeric matrix can be formed by a casting process which does not require the use of monomers or prepolymers, that is, no curing is required. A preferred method employs a copolymer of polyvinylidene difluoride and hexafluoropropylene dissolved in acetone or other suitable solvent. Upon casting the solution, the solvent is evaporated to form the solid polymeric matrix. The solution may be casted directly onto a current collector. Alternatively, the solution is casted onto a substrate, such as a carrier web, and after the solvent (e.g., acetone) is removed, an electrode film is formed thereon.

Preferably, the solid polymeric matrix further comprises a silanized fumed $SiO_2$. The $SiO_2$ is a filler which impart toughness and strength to the polymeric matrix. In addition, it is believed that the $SiO_2$ assists the activation process by creating physico-chemical conditions such that the electrolyte solution quickly and completely fills the pores created in the polymeric matrix by the extraction of the plasticizer.

The term "salt" refers to any salt, for example, an inorganic salt, which is suitable for use in a non-aqueous electrolyte. Representative examples of suitable inorganic ion salts are alkali metal salts of less mobile anions of weak bases having a large anionic radius. Examples of such anions are $I^-$, $Br^-$, $SCN^-$, $ClO_4^-$, $BF_4^-$, $PF_6^-$, $AsF_6^-$, $CF_3COO^-$, $CF_3SO_3^-$, $N(SO_2CF_3)_2^-$, and the like. Specific examples of suitable inorganic ion salts include $LiClO_4$, $LiSCN$, $LiBF_4$, $LiAsF_6$, $LiCF_3SO_3$, $LiPF_6$, $(CF_3SO_2)_2NLi$, $(CF_3SO_2)_3CLi$, $NaSCN$, and the like. The inorganic ion salt preferably contains at least one cation selected from the group consisting of Li, Na, Cs, Rb, Ag, Cu, Mg and K.

The electrolyte typically comprises from about 5 to about 25 weight percent of the inorganic ion salt based on the total weight of the electrolyte; preferably, from about 10 to 20 weight percent; and even more preferably from about 10 to about 15 weight percent. The percentage of salt depends on the type of salt and electrolytic solvent employed.

The term "compatible electrolyte solvent" or "electrolytic solvent," or in the context of components of the non-aqueous electrolyte, just "solvent," is a low molecular weight organic solvent added to the electrolyte and/or the cathode composition, which may also serve the purpose of solvating the inorganic ion salt. The solvent is any compatible, relatively non-volatile, aprotic, relatively polar, solvent. Preferably, these materials have boiling points greater than about 85° C. to simplify manufacture and increase the shelf life of the electrolyte/battery. Typical examples of solvent are mixtures of such materials as dimethyl carbonate, diethyl carbonate, propylene carbonate, ethylene carbonate, methyl ethyl carbonate, gamma-butyrolactone, triglyme, tetraglyme, dimethylsulfoxide, dioxolane, sulfolane, and the like. When using propylene carbonate based electrolytes in an electrolytic cell with graphite anodes, a sequestering agent, such as a crown ether, is added in the electrolyte.

For electrochemical cells where (1) the cathode comprises lithiated cobalt oxides, lithiated manganese oxides, lithiated nickel oxides, $Li_xNi_{1-y}Co_yO_2$, where x is preferably about 1 and y is preferably 0.1–0.9, $LiNiVO_4$, or $LiCoVO_4$, and (2) the anode comprises carbon, the electrolytic solvent preferably comprises a mixture of ethylene carbonate and dimethyl carbonate. For electrochemical cells where the cathode comprises vanadium oxides, e.g., $V_6O_{13}$ and the anode is lithium, the electrolytic solvent preferably comprises a mixture of propylene carbonate and triglyme.

The term "organic carbonate" refers to hydrocarbyl carbonate compounds of no more than about 12 carbon atoms and which do not contain any hydroxyl groups. Preferably, the organic carbonate is an aliphatic carbonate and more preferably a cyclic aliphatic carbonate.

Suitable cyclic aliphatic carbonates for use in this invention include 1,3-dioxolan-2-one (ethylene carbonate);

4-methyl-1,3-dioxolan-2-one (propylene carbonate); 4,5-dimethyl-1,3-dioxolan-2-one; 4-ethyl-1,3-dioxolan-2-one; 4,4-dimethyl-1,3-dioxolan-2-one; 4-methyl-5-ethyl-1,3-dioxolan-2-one; 4,5-diethyl-1,3-dioxolan-2-one; 4,4-diethyl-1,3-dioxolan-2-one; 1,3-dioxan-2-one; 4,4-dimethyl-1,3-dioxan-2-one; 5,5-dimethyl-1,3-dioxan-2-one; 5-methyl-1,3-dioxan-2-one; 4-methyl-1,3-dioxan-2-one; 5,5-diethyl-1,3-dioxan-2-one; 4,6-dimethyl-1,3-dioxan-2-one; 4,4,6-trimethyl-1,3-dioxan-2-one; and spiro (1,3-oxa-2-cyclohexanone-5',5',1',3'-oxa-2'-cyclohexanone).

Several of these cyclic aliphatic carbonates are commercially available such as propylene carbonate and ethylene carbonate. Alternatively, the cyclic aliphatic carbonates can be readily prepared by well known reactions. For example, reaction of phosgene with a suitable alkane-$\alpha,\beta$-diol (dihydroxy alkanes having hydroxyl substituents on adjacent carbon atoms) or an alkane-$\alpha,\gamma$-diol (dihydroxy alkanes having hydroxyl substituents on carbon atoms in a 1,3 relationship) yields an a cyclic aliphatic carbonate for use within the scope of this invention. See, for instance, U.S. Pat. No. 4,115,206, which is incorporated herein by reference in its entirety.

Likewise, the cyclic aliphatic carbonates useful for this invention may be prepared by transesterification of a suitable alkane-$\alpha,\beta$-diol or an alkane-$\alpha,\gamma$-diol with, e.g., diethyl carbonate under transesterification conditions. See, for instance, U.S. Pat. Nos. 4,384,115 and 4,423,205 which are incorporated herein by reference in their entirety. Additional suitable cyclic aliphatic carbonates are disclosed in U.S. Pat. No. 4,747,850 which is also incorporated herein by reference in its entirety.

The term "viscosifier" refers to a suitable viscosifier for solid electrolytes. Viscosifiers include conventional viscosifiers such as those known to one of ordinary skill in the art. Suitable viscosifiers include film forming agents well known in the art which include, by way of example, polyethylene oxide, polypropylene oxide, copolymers thereof, and the like, having a number average molecular weight of at least about 100,000, polyvinylpyrrolidone, carboxymethylcellulose, and the like. Preferably, the viscosifier is employed in an amount of about 1 to about 10 weight percent and more preferably at about 2.5 weight percent based on the total weight of the electrolyte composition.

The anode typically comprises a compatible anodic material which is any material which functions as an anode in a solid electrolytic cell. Such compatible anodic materials are well known in the art and include, by way of example, lithium, lithium alloys, such as alloys of lithium with aluminum, mercury, manganese, iron, zinc, intercalation based anodes such as those employing carbon, tungsten oxides, and the like. Preferred anodes include lithium intercalation anodes employing carbon materials such as graphite, cokes, mesocarbons, disordered carbon, hard carbon and the like. The anode may also include an electron conducting material such as carbon black.

Such carbon intercalation based anodes typically include a polymeric binder and extractable plasticizer suitable for forming a bound porous composite having a molecular weight of from about 1,000 to 5,000,000. Preferred polymeric binders include, but are not limited to, copolymers of vinylidene difluoride and hexafluoropropylene, polyvinylidene difluoride, copolymers of ethylene and acrylic acid, copolymers of ethylene and vinyl acetate, and mixtures thereof. Examples of other suitable polymeric binders include EPDM (ethylene propylene diamine termonomer) and the like. Especially preferred polymers are copolymers of vinylidenedifluoride and hexafluoropropylene. Preferably, the polymer or copolymer employed has a high average molecular weight. Preferably, the average molecular weight is between 50,000 to 750,000, more preferably 50,000 to 200,000, and most preferably 50,000 to 120,000. Furthermore, it is preferred that polymer or copolymer has a narrow molecular weight have range.

The cathode typically comprises a compatible cathodic material (i.e., insertion compounds) which is any material which functions as a positive pole in a solid electrolytic cell. Such compatible cathodic materials are well known in the art and include, by way of example, transition metal oxides, sulfides, and selenides, including lithiated compounds thereof. Representative materials include cobalt oxides, manganese oxides, molybdenum oxides, vanadium oxides, sulfides of titanium, molybdenum and niobium, the various chromium oxides, copper oxides, lithiated cobalt oxides, e.g., $LiCoO_2$ and $LiCoVO_4$, lithiated manganese oxides, e.g., $LiMn_2O_4$, lithiated nickel oxides, e.g., $LiNiO_2$ and $LiNiVO_4$, and mixtures thereof. Cathode-active material blends of $Li_xMn_2O_4$ (spinel) is described in U.S. Pat. No. 5,429,890 which is incorporated herein. The blends can include $Li_xMn_2O_4$ (spinel) and at least one lithiated metal oxide selected from $Li_xNiO_2$ and $Li_xCoO_2$ wherein $0<x\leq 2$. Blends can also include $Li_y$-$\alpha$-$MnO_2$ ($0\leq y<1$) which is $Li_yNH_4Mn_8O_{16}$ ($0\leq y<1$) which has a hollandite-type structure. $Li_y$-$\alpha$-$MnO_2$ wherein $0\leq y<0.5$ is preferred. $\alpha MnO_2$ can be synthesized by precipitation from a reaction between a $MnSO_4$ solution and $(NH_4)_2S_2O_8$ as an oxidizing agent.

Lithiation (also referred to as "prelithiation") of $\alpha MnO_2$ can be accomplished via a solid state reaction:

$$NH_4Mn_8O_{16} + LiOH \rightarrow LiMnO_2 \ (400°\ C.).$$

Li-$\alpha$-$MnO_2$ retains the same structure as Hollandite. See, Botkovitz et. al., J. of Power Sources, 43–44 (1993) 657–665, which is incorporated herein, for a discussion of the structure and electrochemical characteristics of Li-$\alpha$-$MnO_2$. $Li_y$-$\alpha$-$MnO_2$ wherein $0\leq y<0.5$ is commercially available from SEDEMA, Tertre, Belgium.

In one preferred embodiment, the compatible cathodic material is mixed with an electroconductive material including, by way of example, graphite, powdered carbon, powdered nickel, metal particles, conductive polymers (i.e., characterized by a conjugated network of double bonds like polypyrrole and polyacetylene), and the like, and a polymeric binder to form under pressure a positive cathodic plate.

Suitable binders for use in the cathode have a molecular weight of from about 1,000 to 5,000,000. Preferred polymeric binders include, but are not limited to, copolymers of vinylidene difluoride and hexafluoropropylene, polyvinylidene difluoride, copolymers of ethylene and acrylic acid, copolymers of ethylene and vinyl acetate, and mixtures thereof. Examples of other suitable polymeric binders include EPDM (ethylene propylene diamine termonomer) and the like. Especially preferred polymers are copolymers of vinylidenedifluoride and hexafluoropropylene. Preferably, the polymer or copolymer employed has a high average molecular weight. Preferably, the average molecular weight is between 50,000 to 750,000, more preferably 50,000 to 200,000, and most preferably 50,000 to 120,000. Furthermore, it is preferred that polymer or copolymer has a narrow molecular weight have range.

In one preferred embodiment, the cathode is prepared from a cathode paste which comprises from about 35 to 65 weight percent of a compatible cathodic material; from about 1 to 20 weight percent of an electroconductive agent; from about 1 to 20 weight percent of suitable polymeric binders that may include EPDM (ethylene propylene diene termonomer), PVDF (polyvinylidene difluoride), EAA (ethylene acrylic acid copolymer), EVA (ethylene vinyl acetate copolymer), EAA/EVA copolymers, and the like; from about 0 to about 20 weight percent of polyethylene oxide having a number average molecular weight of at least 100,000; from about 10 to 50 weight percent of solvent comprising a 10:1 to 1:4 (w/w) mixture of an organic carbonate and a glyme; and from about 5 weight percent to about 25 weight percent of a solid matrix forming monomer or partial polymer thereof. Also included is an ion conducting amount of an inorganic ion salt. Generally, the mount of the salt is from about 1 to about 25 weight percent. (All weight percents are based on the total weight of the cathode.)

The electrolyte composition typically comprises from about 5 to about 25 weight percent of the inorganic ion salt based on the total weight of the electrolyte; preferably, from about 10 to 20 weight percent; and even more preferably from about 10 to about 15 weight percent. The percentage of salt depends on the type of salt and electrolytic solvent employed.

The electrolyte composition typically comprises from 0 to about 80 weight percent electrolyte solvent (e.g., organic carbonate/glyme mixture) based on the total weight of the electrolyte; preferably from about 60 to about 80 weight percent; and even more preferably about 70 weight percent.

The electrolyte composition typically comprises from about 5 to about 30 weight percent of the solid polymeric matrix based on the total weight of the electrolyte; preferably from about 15 to about 25 weight percent.

In a preferred embodiment, the electrolyte composition further comprises a small amount of a film forming agent. Suitable film forming agents are well known in the art and include, by way of example, polyethylene oxide, polypropylene oxide, copolymers thereof, and the like, having a numbered average molecular weight of at least about 100, 000. Preferably, the film forming agent is employed in an amount of about 1 to about 10 weight percent and more preferably at about 2.5 weight percent based on the total weight of the electrolyte composition.

METHODOLOGY

Electrochemical cells are known in the art. See, for example, U.S. Pat. Nos. 5,300,373, 5,316,556, 5,346,385, 5,262,253, 4,472,487, 4,668,595, and 5,028,500, all of which are incorporated herein. The methods of this invention can be adapted to form porous anode, cathode, and/or polymeric matrix structures in prior art electrochemical cells.

In a preferred embodiment, the extraction method of the present invention is conducted by first placing an electrochemical cell precursor comprising (i) an anode composition comprising an anodic material, a first polymer, and a first plasticizer; (ii) a cathode composition comprising a cathode active material, a second polymer, and a second plasticizer; and (iii) a polymeric matrix comprising a third polymer and a third plasticizer, in a vessel. An extraction solvent is then introduced into the vessel so that the electrochemical cell precursor is contacted with, and preferably immersed in, the extraction solvent. Ultrasound waves are then applied to the electrochemical cell precursor and the extraction solvent in the vessel so that the first, second and/or third plasticizer in the electrochemical cell precursor is solubilized into the extraction solvent. The extraction solvent containing the plasticizer is then removed from contact with the electrochemical cell precursor.

This extraction process can be performed using either batch processes or continuous extraction methods. In a preferred embodiment, the extraction solvent flows or is circulated through the extraction vessel so that extraction solvent containing extracted plasticizer is continually removed from the extraction vessel while pure or fresh extraction solvent is added. Preferably, the extraction solvent is vigorously mixed during the extraction process either by mechanical means, such as stirring, or by bubbling air or nitrogen through the extraction vessel.

The ultrasound waves employed in the methods of this invention can be generated using any conventional ultrasound wave generating device. Typically, the ultrasound waves are applied to or generated by the vessel containing the electrochemical cell precursor and the extraction solvent. Alternatively, ultrasound waves can be applied directly to the electrochemical cell precursor by means of an ultrasonic probe.

Preferably, the ultrasound waves employed have a frequency ranging from about 30 kHz to about 45 kHz. More preferably, the ultrasound waves have a frequency ranging from about 38 kHz to about 42 kHz. In a preferred embodiment, a sweeping frequency, i.e. a frequency continuously increasing and decreasing from about 30 kHz to about 45 kHz, preferably from 38 kHz to about 42 kHz, is employed to eliminate standing waves.

Any art-recognized apparatus or vessel may be used to conduct the extraction process. A preferred apparatus for conducting the extraction is a Bransonic Ultrasonic Cleaner (Model 5210-MTH), available from VWR Scientific Products.

The extraction process is preferably carried out at a temperature ranging from ambient to the boiling point of the extraction solvent. In one preferred embodiment, the extraction is carried out at a temperature of from about 0° to about 50° C., still more preferably, from about 20° C. to about 30° C. In another preferred embodiment, the extraction is carried out at a temperature near but less than the boiling point of the extraction solvent, preferably less than about 10° C. below the boiling point of the extraction solvent.

The ultrasonic extraction process of this invention extracts at least a portion of the plasticizer from the electrochemical cell precursor. Preferably, at least 50% of the total amount of plasticizer in the electrochemical cell precursor is extracted by the ultrasonic extraction process. More preferably, at least 75% and still more preferably at least 90% of the plasticizer is removed by the extraction process. Removal of at least 95% of the plasticizer is especially preferred.

The extraction solvent used in the methods of this invention can be recovered and recycled by, for example, conventional distillation techniques, such as flash distillation. Similarly, the plasticizer can be recovered and re-used after removal of the extraction solvent.

EXAMPLES

The following examples are offered to illustrate this invention and are not to be construed in any way as limiting the scope of this invention. In these examples, the invention will be described using anode and cathode structures in which electrode materials (or films) are laminated onto both sides of the current collectors. It is to be understood, however, that the invention is applicable to other configurations, for example, where one side of the anode and/or cathode current collector is laminated.

Example 1

Preparation of an Anode Composition

A polymer mixture comprising a copolymer of vinylidenedifluoride (VDF) and hexafluoropropylene (HFP) was prepared by mixing 6.8 grams of the copolymer in 20 grams of acetone. The copolymer (average molecular weight 125,000) was Kynar Flex 2801™ from Elf Atochem North America, in Philadelphia, Pa. The mixture was stirred for about 24 hours in a milling jar available from VWR Scientific, in San Francisco, Calif., model H-04172-00. The copolymer functions as a binder for the carbon in the anode.

A graphite mixture was prepared separately by first adding 23.4 grams of graphite into 0.9 grams of carbon black into a solution containing 60 grams acetone, 10.5 grams dibutyl phthalate, and 0.5 grams of a surfactant. A preferred graphite is available under the designation BG35 graphite from Superior Graphite Co., Chicago, Ill. A preferred carbon black is available under the designation Super P™ from M. M. M. Carbon, Willebroek, Belgium. The graphite mixture was then vigorously mixed in a high shear mixer until a substantially homogeneous blend was formed. A suitable mixer is available from Ross, Model ME100DLX, Hauppauge, N.Y., operating at its highest setting (about 10,000 RPM) for 30 minutes.

An anode slurry was then prepared by mixing the polymer mixture and the graphite mixture together under low shear conditions to form an anode slurry wherein the components are well mixed. A portion of the acetone was allowed to evaporate from the slurry and it was then laminated onto each side of a current collector. The anode current collector employed was a sheet of expanded copper metal that is about 50 µm thick. It is available under the designation 2Cu5-125 (flatten) from Delker, in Branford, Conn. Anode films formed when the remaining portion of the acetone evaporated.

Example 2

Preparation of a Cathode Composition

A polymer mixture comprising a copolymer of vinylidenedifluoride (VDF) and hexafluoropropylene (HFP) was prepared by mixing 4.4 grams of the copolymer in 15 ml of acetone. The copolymer was Kynar Flex 2801™. The mixture was stirred for about 24 hours in a milling jar.

A cathode mixture was prepared separately by mixing 28.9 grams of $LiMn_2O_4$, 2.4 grams of carbon black (Super P™) into a solution containing 60 grams acetone and 8.7 grams dibutyl phthalate. The mixture was then vigorously mixed in the a high shear mixer until a substantially homogeneous blend was formed. The amount of cathode-active material $LiMn_2O_4$ employed can be varied to provide different cathode to anode mass ratios.

A cathode slurry was prepared by mixing the polymer mixture and the cathode mixture together under low shear conditions to form the cathode slurry wherein the components are well mixed. A portion of the acetone was allowed to evaporate from the slurry and it was then laminated onto each side of a cathode current collector. The cathode current collector employed was a sheet of expanded aluminum that is about 50 µm thick. The aluminum grid is available under the designation 2AL5-077 from Delker, in Branford, Conn. Cathode films formed when the remaining portion of the acetone evaporated.

The above anode and cathode films were formed directly on the current collector by laminating the slurry mixtures onto the current collector surfaces. Alternatively, each film can be prepared by first casting a slurry onto a substrate or carrier web and allowing the solvent to evaporate thus leaving the film. Thereafter, the films can be laminated onto each side of the current collector.

Example 3

Preparation of a Polymeric Matrix

A polymeric matrix was formed by casting a polymeric slurry comprising acetone, dibutyl phthalate, silanized fumed $SiO_2$, and the VDF/HFP copolymer on a suitable substrate or carrier web and allowing the acetone to evaporate. No curing by radiation is required. The $SiO_2$ is a filler which imparts toughness and strength to the film. In addition, it is believed that the $SiO_2$ assists the activation process by creating physico-chemical conditions such that the electrolyte solution quickly and completely fills the pores created by the extraction of the dibutyl phthalate. Preferably, the polymeric slurry is mixed under low shear conditions as not to degrade the copolymer.

Example 4

Preparation of Electrochemical Cells Using Ultrasonic Extraction

Solid electrochemical cells were prepared by first positioning a polymeric matrix prepared as described in Example 3 above between an anode and a cathode prepared as described in Examples 1 and 2 above, respectively. The components were then fused under moderate pressure and temperature (e.g., 130° C.) to form an electrochemical cell precursor.

Dibutyl phthalate plasticizer was then extracted from the electrochemical cell precursors by immersing each cell in methanol in a Bransonic Ultrasonic Cleaner (Model 5210-MTH), available from VWR Scientific Products, San Francisco, Calif. Each extraction was conducted in three phases, with each phase consisting of an ultrasonic extraction period of 5 or 10 minutes.

The extracted electrochemical cell precursors were then activated by immersion under a substantially moisture-free atmosphere in a 1M electrolyte solution of $LiPF_6$ in ethylene carbonate/dimethyl carbonate (2:1 by weight) for about 50 minutes to provide electrochemical cells. Each cell was then tested under constant current conditions using a Battery Cycler, available from Maccor, Inc., to determine the first cycle loss percent. The results are set forth in Table I below.

Comparative Example A

Preparation of Electrochemical Cells Using Conventional Extraction

Solid electrochemical cells were prepared as described in Example 4 above except that the extraction was conducted by immersing each electrochemical cell precursor in a circulating bath of methanol. The extraction was conducted in three phases, with each phase consisting of an immersion period of 20 minutes.

The resulting cells, after activation, were tested under constant current conditions as described above to determine the first cycle loss percent. The results are set forth in Table I below.

TABLE I

Determination of First Cycle Loss Percent

| Example No. | Extraction Time (min.) | Charge Capacity (Ah) | Discharge Capacity (Ah) | First Cycle Loss (%) |
|---|---|---|---|---|
| 4A | 3 × 5 | 0.218 | 0.183 | 16 |
| 4B | 3 × 5 | 0.217 | 0.167 | 23 |
| 4C | 3 × 5 | 0.209 | 0.167 | 20 |
| 4D | 3 × 5 | 0.206 | 0.161 | 22 |
| 4E | 3 × 5 | 0.211 | 0.169 | 20 |
| 4F | 3 × 10 | 0.217 | 0.174 | 20 |
| 4G | 3 × 10 | 0.219 | 0.183 | 16 |
| 4H | 3 × 10 | 0.219 | 0.183 | 17 |
| 4I | 3 × 10 | 0.219 | 0.179 | 18 |
| A[1] | 3 × 20 | 0.215–0.225 | 0.180–0.187 | 15–17 |

[1]Comparative Example A above.

It is well known that electrochemical cells containing residual dibutyl phthalate plasticizer have an increased first cycle loss percent. The results in Table I demonstrate that ultrasonic extraction for 15 or 30 minutes affords an electrochemical cell having a first cycle loss percent which is equivalent to a cell extracted under conventional conditions for 60 minutes (Comparative Example A). Thus, ultrasonic extraction unexpectedly reduces the total time necessary to remove a plasticizer from an electrochemical cell precursor by 50 to 75 percent.

Although only preferred embodiments of the invention are specifically disclosed and described above, it will be appreciated that many modifications and variations of the present invention are possible in light of the above teachings and within the purview of the appended claims without departing from the spirit and intended scope of the invention.

What is claimed is:

1. A method for removing plasticizer from an electrochemical cell precursor, said method comprising the steps of:
    (a) contacting an electrochemical cell precursor comprising (i) an anode composition comprising an anodic material, a first polymer, and a first plasticizer; (ii) a cathode composition comprising a cathode active material, a second polymer, and a second plasticizer; and (iii) a polymeric matrix comprising a third polymer and a third plasticizer, with an extraction solvent; and
    (b) applying ultrasound waves to the electrochemical cell precursor and the extraction solvent to extract at least a portion of the first, second and/or third plasticizer from the electrochemical cell precursor.

2. The method according to claim 1 wherein said anodic material comprises a carbon material selected from the group consisting of carbon black, coke, graphite, disordered carbon, hard carbon and mixtures thereof.

3. The method according to claim 1 wherein said cathode active material is selected from the group consisting of $Li_xMn_2O_4$, wherein $0<x\leq 2$, $LiCoO_2$, $LiNiO_2$, $LiNi_yCo_{1-y}O_2$, wherein $0<y<1$, and mixtures thereof.

4. The method according to claim 1 wherein said first, second and third polymers are each independently selected from the group consisting of copolymers of vinylidene difluoride and hexafluoropropylene, polyvinylidene difluoride, copolymers of ethylene and acrylic acid, copolymers of ethylene and vinyl acetate, and mixtures thereof.

5. The method according to claim 4 wherein said first, second and third polymers are copolymers of vinylidene difluoride and hexafluoropropylene.

6. The method according to claim 1 wherein said first, second and third plasticizers are each independently selected from the group consisting of dialkyl phthalates, wherein each alkyl group independently contains 1 to about 12 carbon atoms; trisbutoxyethyl phosphate; propylene carbonate; ethylene carbonate; and mixtures thereof.

7. The method according to claim 6 wherein said first, second and third plasticizers are dialkyl phthalates independently selected from the group consisting of dimethyl phthalate, diethyl phthalate, dibutyl phthalate, dioctyl phthalate and mixtures thereof.

8. The method according to claim 7 wherein said first, second and third plasticizers are dibutyl phthalate.

9. The method according to claim 1 wherein said extraction solvent is selected from the group consisting of alkanes and cycloalkanes having 5 to about 12 carbon atoms; aliphatic alcohols having 1 to about 12 carbon atoms; haloalkanes and haloalkenes having 1 to about 6 carbon atoms; dialkyl ethers and cycloalkyl ethers having 4 to about 12 carbon atoms; dialkyl formates, wherein each alkyl group independently contains 1 to about 6 carbon atoms; dialkyl carbonates, wherein each alkyl group independently contains 1 to about 6 carbon atoms; and mixtures thereof.

10. The method according to claim 9 wherein said extraction solvent is an aliphatic alcohol selected from the group consisting of methanol, ethanol, n-propanol, isopropanol, n-butanol, isobutanol and mixtures thereof.

11. The method according to claim 10 wherein said extraction solvent is methanol.

12. The method according to claim 1 wherein said method further comprises:
    (c) removing the extraction solvent from contact with the electrochemical cell precursor.

13. The method according to claim 1 wherein step (b) is carried out at a temperature ranging from ambient temperature to the boiling point of the extraction solvent.

14. A method of preparing an electrochemical cell, which method comprises the steps of:
    (a) forming an anode composition comprising an anodic material, a first polymer, and a first plasticizer;
    (b) forming a cathode composition comprising a cathode active material, a second polymer, and a second plasticizer;
    (c) forming a polymeric matrix comprising a third polymer and a third plasticizer;
    (d) bonding said polymeric matrix to said anode composition and said cathode composition to form an electrochemical cell precursor;
    (e) extracting at least a portion of said first, second and/or third plasticizer from said electrochemical cell precursor by contacting said electrochemical cell precursor with an extraction solvent while simultaneously applying ultrasound waves to said electrochemical cell precursor and said extraction solvent; and
    (f) contacting said electrochemical cell precursor with an electrolyte solution comprising an electrolyte solvent and a salt to form an electrochemical cell.

15. The method according to claim 14 wherein said anodic material comprises a carbon material selected from the group consisting of carbon black, coke, graphite, disordered carbon, hard carbon and mixtures thereof.

16. The method according to claim 14 wherein said cathode active material is selected from the group consisting of $Li_xMn_2O_4$, wherein $0<x\leq 2$, $LiCoO_2$, $LiNiO_2$, $LiNi_yCo_{1-y}O_2$, wherein $0<y<1$, and mixtures thereof.

17. The method according to claim 14 wherein said first, second and third polymers are each independently selected from the group consisting of copolymers of vinylidene difluoride and hexafluoropropylene, polyvinylidene difluoride, copolymers of ethylene and acrylic acid, copolymers of ethylene and vinyl acetate, and mixtures thereof.

18. The method according to claim 17 wherein said first, second and third polymers are copolymers of vinylidene difluoride and hexafluoropropylene.

19. The method according to claim 14 wherein said first, second and third plasticizers are each independently selected from the group consisting of dialkyl phthalates, wherein each alkyl group independently contains 1 to about 12 carbon atoms; trisbutoxyethyl phosphate; propylene carbonate; ethylene carbonate; and mixtures thereof.

20. The method according to claim 19 wherein said first, second and third plasticizers are dialkyl phthalates independently selected from the group consisting of dimethyl phthalate, diethyl phthalate, dibutyl phthalate, dioctyl phthalate and mixtures thereof.

21. The method according to claim 20 wherein said first, second and third plasticizers are dibutyl phthalate.

22. The method according to claim 14 wherein said extraction solvent is selected from the group consisting of alkanes and cycloalkanes having 5 to about 12 carbon atoms; aliphatic alcohols having 1 to about 12 carbon atoms; haloalkanes and haloalkenes having 1 to about 6 carbon atoms; dialkyl ethers and cycloalkyl ethers having 4 to about 12 carbon atoms; dialkyl formates, wherein each alkyl group independently contains 1 to about 6 carbon atoms; dialkyl carbonates, wherein each alkyl group independently contains 1 to about 6 carbon atoms; and mixtures thereof.

23. The method according to claim 22 wherein said extraction solvent is an aliphatic alcohol selected from the group consisting of methanol, ethanol, n-propanol, isopropanol, n-butanol, isobutanol and mixtures thereof.

24. The method according to claim 23 wherein said extraction solvent is methanol.

25. The method according to claim 14 wherein said electrolyte solvent comprises one or more organic carbonates.

26. The method according to claim 25 wherein said electrolyte solvent comprises a mixture of ethylene carbonate and dimethyl carbonate.

27. The method according to claim 14 wherein said salt is an alkali metal salt of an anion selected from the group consisting of $I^-$, $Br^-$, $SCN^-$, $ClO_4^-$, $BF_4^-$, $PF_6^-$, $AsF_6^-$, $CF_3COO^-$, $CF_3SO_3^-$, and $N(SO_2CF_3)_2^-$.

* * * * *